April 10, 1951  G. F. GILSON  2,548,302

MACHINE FOR CUTTING ARCUATE MEMBERS

Filed Sept. 17, 1946  2 Sheets-Sheet 1

INVENTOR
GUY F. GILSON
by William B. Hall
ATTORNEY

April 10, 1951        G. F. GILSON        2,548,302

MACHINE FOR CUTTING ARCUATE MEMBERS

Filed Sept. 17, 1946        2 Sheets-Sheet 2

INVENTOR
GUY F. GILSON
by William B. Hall
ATTORNEY

Patented Apr. 10, 1951

2,548,302

UNITED STATES PATENT OFFICE 2,548,302

MACHINE FOR CUTTING ARCUATE MEMBERS

Guy F. Gilson, Los Angeles, Calif.

Application September 17, 1946, Serial No. 697,403

5 Claims. (Cl. 33—26)

My invention relates to a cutting torch apparatus for cutting round or arcuate members.

One of the principal objects of this invention is to provide a cutting torch in the form of a machine for cutting round or arcuate members of extremely large or small radii.

Another important object of this invention is to provide a machine of this class which may be easily and quickly set up for cutting circular and arcuate members of various radii, and a machine of this class whereby many small diameter discs may be cut from the same plate with only slight adjustment of the machine.

An important object also of this invention is to provide a table for a machine of this class which is so constructed that the supporting elements of the table may be readily adjusted so that they will not interfere with the flame of the cutting torch, and also in which the elements of the table will not interfere with the dropping of the members or portions cut from the plate on the table.

A further important object of this invention is to provide a machine in which the cutting torch is so mounted with respect to the torch-supporting center member that discs, or similar members of extremely small radii, may be cut by the machine.

A still further object of this invention is to provide a machine of this class in which the torch-carrying member may be readily adjusted with respect to the plate, or other work, which is adapted to be cut by the machine, and further so that the centering member may be readily raised out of the way and also readily adjusted in a vertical direction with respect to the plate, or other work, to be cut.

An important object also is to provide a machine of this class having a swinging head, which is so arranged with respect to a work-supporting table below that the work on substantially all portions of the table is readily accessible.

With these and other objects in view, as will appear hereinafter, I have devised a cutting torch having certain novel features of construction, combination, and arrangement of parts and portions, as will be hereinafter described in detail and particularly set forth in the appended claims, reference being had to the accompanying drawings and to the characters of reference thereon, which form a part of this application, in which:

Figure 1:
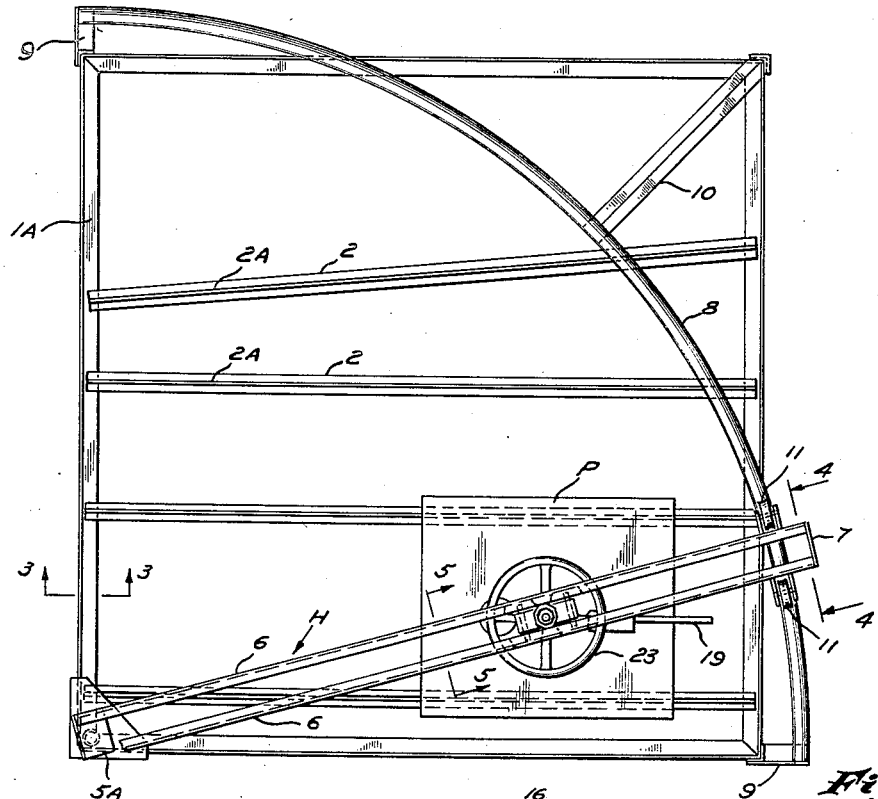
Fig. 1 is a plan view of a cutting torch embodying my invention in a preferred form, portions thereof being broken away and in section to facilitate the illustration.
Figure 2:
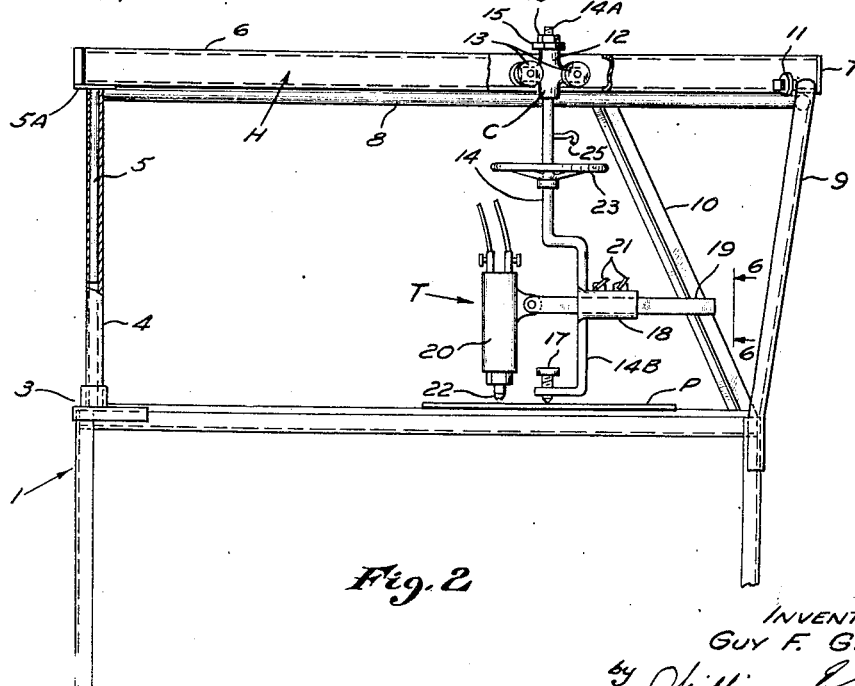
Fig. 2 is a fragmentary side elevational view thereof, also showing portions broken away to facilitate the illustration.
Figure 3:
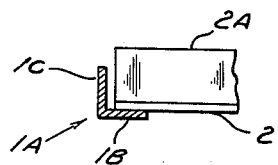
Fig. 3 is an enlarged fragmentary sectional view, taken through 3—3 of Fig. 1, showing a feature of the construction of the work-supporting table.
Figure 4:
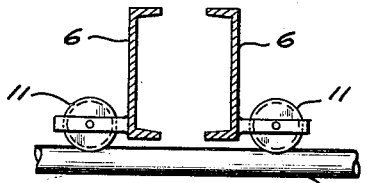
Fig. 4 is a sectional view, taken through 4—4 of Fig. 1, showing the mounting of the fixed end of the horizontal head or beam supporting the torch itself.

My cutting torch apparatus illustrated in the drawings is shown as carried or mounted on a frame in the form of a table 1. This table is rectangular in shape having a rectangular upper portion 1$^A$ made of structural angles, one flange, designated 1$^B$, being horizontal and providing a supporting ledge, and the other flange, designated 1$^C$, providing a vertical enclosure surrounding the supporting ledge. The work-supporting means of the table consists of a plurality of loose structural elements 2 of T-shape cross-section in which the long or intermediate flanges 2$^A$ extend upwardly and provide narrow ledges upon which plates, or other work, are adapted to be supported. Figures 1 and 2 show a plate P in such position.

At one corner of the table is provided a bracket 3 having an upwardly extending hollow column 4. The head, designated H, of my cutting torch apparatus is provided at one end with a vertical arbor 5, which is rotatably mounted within the column 4. This arbor has a flange 5$^A$ at its upper end which rests upon the upper end of the column. The head H comprises essentially a pair of channels 6, which are horizontally spaced apart with their channel portions facing each other. One end of the members 6 is secured to the upper portion of and extends from the flange 5$^A$. The free ends of the channel members 6 may be secured together by a strap 7.

The free end of the head or beam may be supported by a rail 8, which may be a tubular member and which may be arranged in arcuate form about the axis of the column 4. This rail may be supported above the table so that the ends extend beyond two sides of the table, and the intermediate portion thereof may be located inwardly from the opposed corner of the table. As shown, the ends of the rail are supported from the corners of the table by brackets 9, and the intermediate portion of the rail may be supported at the opposite corner by a bracket 10.

The head or beam H may be provided at the opposite side with rollers 11 which ride upon the rail 8.

Figure 5:
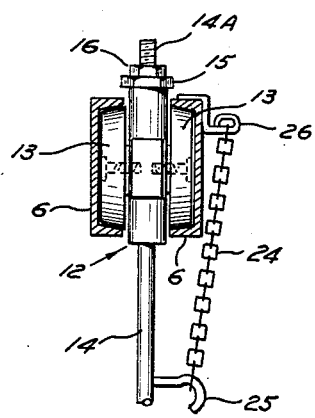
Fig. 5 is a sectional view, taken through 5—5 of Fig. 1, showing the mounting of the torch-supporting carriage on the head or beam; and, Fig. 6 is an enlarged fragmentary sectional view, taken at 6—6 of Fig. 2.
Figure 6:
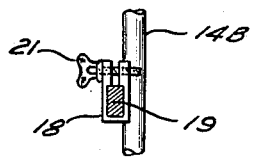

The torch proper, which is designated T, depends from and is carried longitudinally of the head or beam H by a carriage C. This carriage C consists of a body 12 movably mounted between the two channel members 6. At the opposite sides of the opposite ends of the body 12 are mounted wheels 13, which ride upon or between the opposite flanges of the channel members 6, as shown in Figs. 1, 2, and 5. The upper and lower ends of the intermediate portion of the body may extend above and below the channel members, as shown in Figs. 2 and 5.

From this carriage C extends a longitudinal centering member 14, the upper end of the centering member extending between the channel members 6 and through the body 12. The upper end of the centering member is threaded, as indicated by 14A, and on this threaded portion is provided, respectively, an adjusting nut 15 and a lock-nut 16.

The lower portion of the centering member is laterally offset at 14B so that the cutting torch T may be adjusted closer to vertical alignment with the centering member 14. In the lower end of the centering member is adjustably provided a vertical centering screw 17. The lower end of this screw is provided with a centering point which may be centered within a center punch hole provided in the plate or other work P. On the vertical member of the offset portion 14B is provided a split socket member 18 having a horizontal opening in which is slidably mounted an arm 19 on the end of which is mounted the housing 20 of the torch T. The torch T is preferably so mounted that it may be tilted about a transverse pivot of the arm 19. The arm 19 is locked in adjusted position within the socket member 18 by thumb screws or nuts 21.

The torch T may be of conventional construction and provided with a tip 22 at its lower end, which may be adjusted to any desired position above the plate P. When the torch T is swung around the vertical axis of the centering screw 17, which is anchored in a centering hole in the plate, the tip 22 will make a circular cut in the plate. The supporting elements 2 are so arranged that the cut discs or other portion of the plate P will drop between such supporting elements 2.

In order to facilitate the rotation of the centering member 14, a hand-wheel 23 is provided thereon so that the torch T may be rotated conveniently about the center of the screw 17.

When desiring to raise the torch T above the work P, the centering member 14 is raised vertically, and it may be held in such raised position by a chain 24 connected by a hook or eye member 25 to the centering member 14 and by a hook 26 to the head or beam H.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In a cutting apparatus, a table, a column extending upwardly from the table, a horizontal head mounted at one end on the column and capable of swinging about the axis thereof over the top of the table, an arcuate rail arranged concentrically about the axis of the column, the opposite end of the head being capable of riding freely upon the rail, a carriage mounted to move on and lengthwise of the head, a vertical torch-centering member depending from the carriage and provided at its lower end with a centering portion, and a torch mounted on the centering member and rotatable in a horizontal path about the vertical axis extending through the centering portion.

2. In a cutting apparatus, a table, a column extending upwardly from the table, a horizontal head mounted at one end on the column and capable of swinging about the axis thereof over the top of the table, an arcuate rail arranged concentrically about the axis of the column, the opposite end of the head being capable of riding freely upon the rail, a carriage mounted to move on and lengthwise of the head, a vertical member depending from the carriage, and a torch mounted on the member.

3. In a cutting apparatus, a rectangular table, a column extending upwardly from one corner of the table, a horizontal head mounted at the upper end of the column and capable of swinging freely about the axis thereof over the top of the table, an arcuate rail arranged concentrically about the axis of the column, the ends of the rail extending between the sides of the table adjacent said corner, a brace extending between the opposite corner of said table and the intermediate portion of said rail, the free end of the head being capable of riding freely upon the rail, a carriage mounted to move on and lengthwise of the head, a vertical member depending from the carriage, and a torch mounted on the lower portion of said member.

4. In a cutting apparatus, a rectangular table, a column extending upwardly from one corner of the table, a horizontal head mounted at the upper end of the column and capable of swinging freely about the axis thereof over the top of the table, an arcuate rail arranged concentrically about the axis of the column, said rail being of substantially 90 degrees in extent and the radius thereof being greater than the sides of the table, the free end of the head being capable of riding freely upon the rail, a carriage mounted to move on and lengthwise of the head, a vertical member depending from the carriage, and a torch mounted on the lower portion of said member.

5. In a cutting apparatus, a rectangular table, a column extending upwardly from one corner of the table, a horizontal head mounted at the upper end of the column and capable of swinging freely about the axis thereof over the top of the table, an arcuate rail arranged concentrically about the axis of the column, the free end of the head extending beyond said arcuate rail and being capable of riding freely thereon inwardly from the free end of the head, a carriage mounted to move on and lengthwise of the head, a vertical member depending from the middle portion of the carriage, the portion of the carriage positioned on the opposite side of the axis of the member from said column being capable of extending over said rail whereby the vertical member may move close to the concave portion of the rail, and a torch mounted on the lower portion of said member.

GUY F. GILSON.

(References on following page)

REFERENCES CITED

The following references are of record in the file of this patent:

UNITED STATES PATENTS

| Number | Name | Date |
|---|---|---|
| 100,072 | Ritchie | Feb. 22, 1870 |
| 859,664 | Jottrand et al. | July 9, 1907 |
| 884,762 | Risting et al. | Apr. 14, 1908 |
| 954,476 | Spunar | Apr. 12, 1910 |
| 1,176,584 | Madgett | Mar. 21, 1916 |
| 1,324,005 | Bucknam | Dec. 2, 1919 |
| 2,107,396 | Schoitz | Feb. 8, 1938 |
| 2,265,287 | Johnson | Dec. 9, 1941 |
| 2,363,007 | Kohlhafer et al. | Nov. 21, 1944 |
| 2,377,844 | Stone | June 5, 1945 |

FOREIGN PATENTS

| Number | Country | Date |
|---|---|---|
| 440,508 | France | May 6, 1912 |
| 732,063 | France | June 6, 1932 |
| 438,940 | Great Britain | Nov. 26, 1935 |